J. C. VAN AKEN.
SLED.
APPLICATION FILED MAY 29, 1912.
1,062,204.
Patented May 20, 1913.
2 SHEETS—SHEET 1.
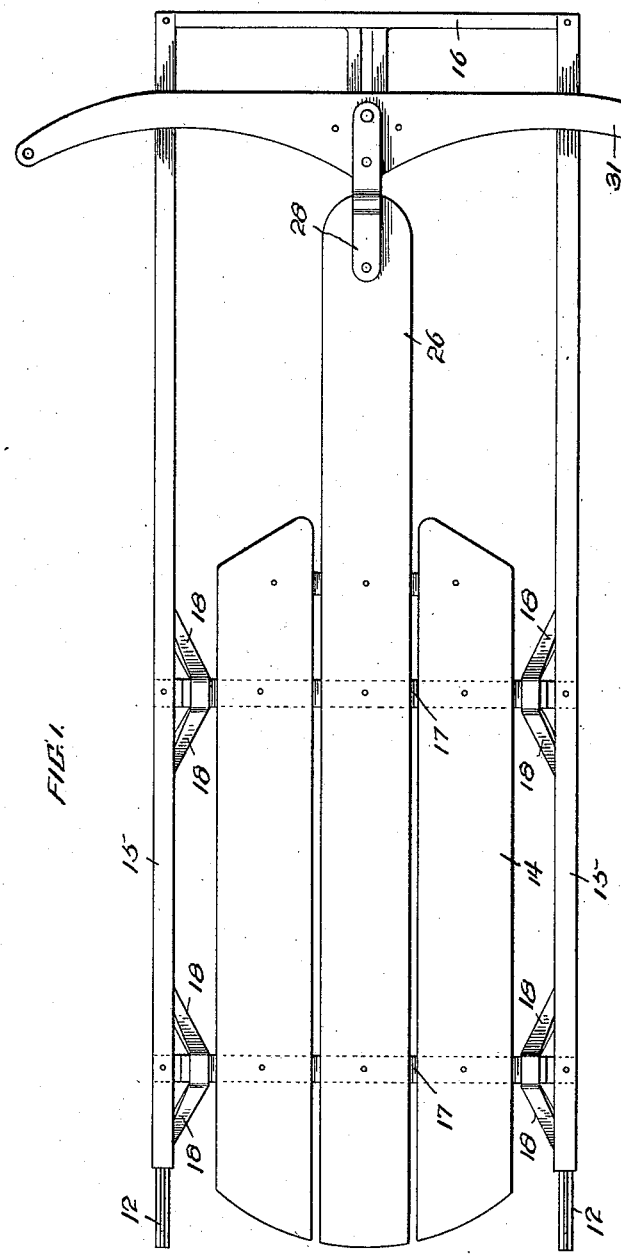
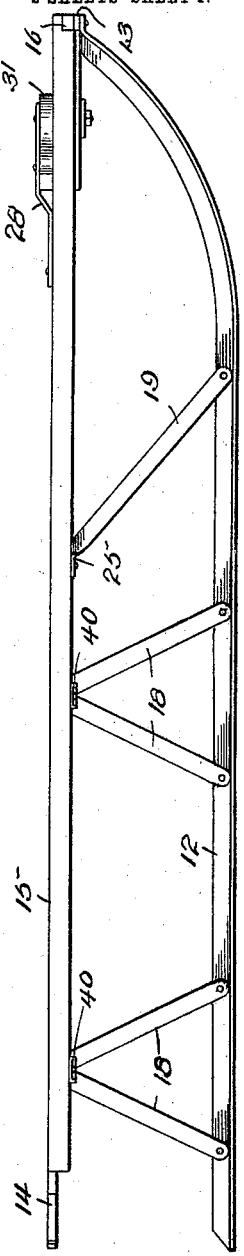
WITNESSES:
INVENTOR
BY
Attorneys

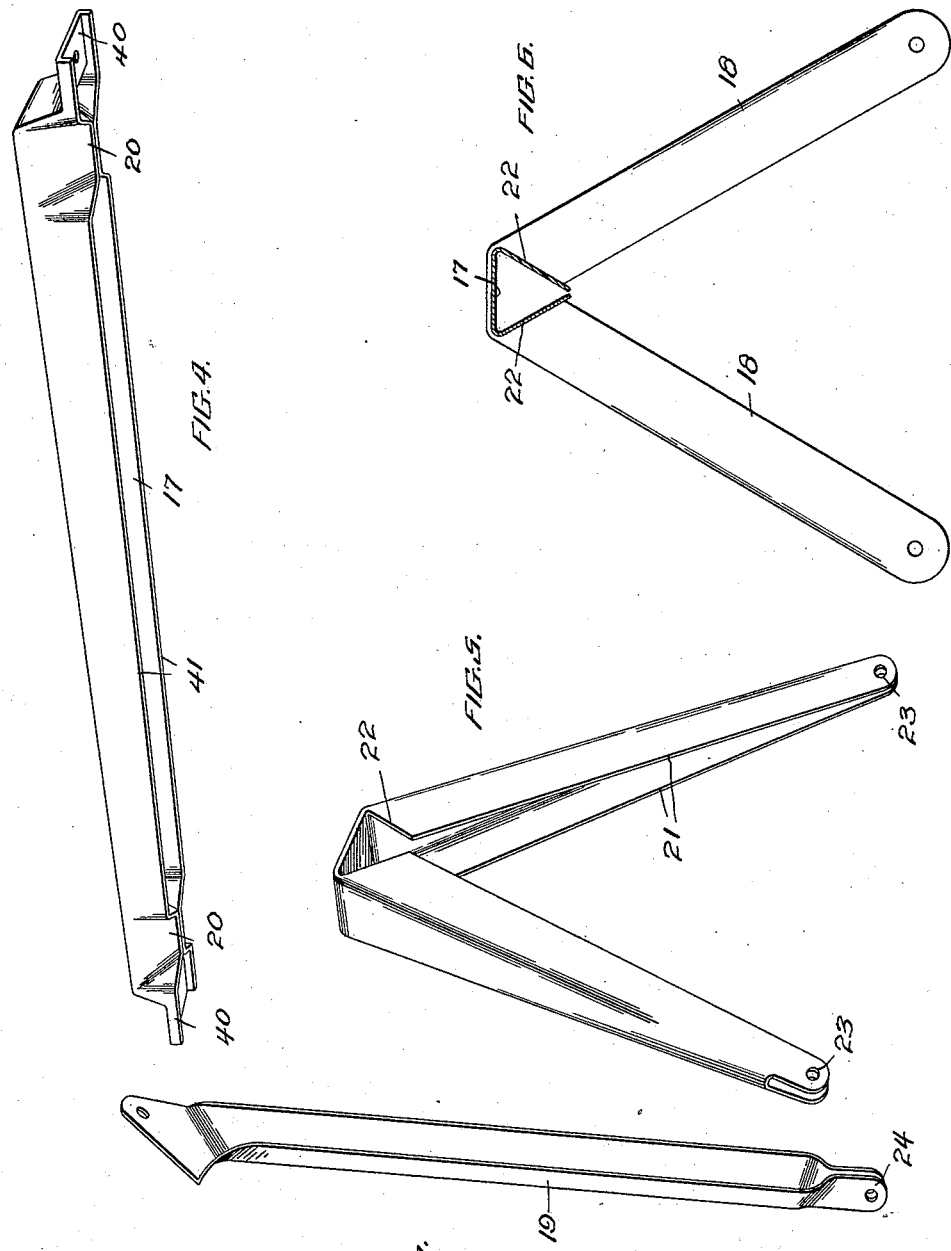

UNITED STATES PATENT OFFICE.

JOHN C. VAN AKEN, OF RIDGWAY, PENNSYLVANIA.

SLED.

1,062,204. Specification of Letters Patent. Patented May 20, 1913.

Original application filed February 12, 1912, Serial No. 677,086. Divided and this application filed May 29, 1912. Serial No. 700,447.

*To all whom it may concern:*

Be it known that I, JOHN C. VAN AKEN, a citizen of the United States, residing at Ridgway, in the county of Elk and State of Pennsylvania, have invented or discovered certain new and useful Improvements in Sleds, of which the following is a specification, reference being had therein to the accompanying drawings.

This invention relates particularly to sleds of the type having flexible runners and provided with means for bending said runners laterally for the purpose of steering the sled, and has for its object to provide an improved construction or framework for supporting the top or body of the sled from the runners.

The invention will best be understood from the following description of one form thereof illustrated in the accompanying drawings in which the invention is shown as embodied in a sled of the character disclosed in my prior application for Letters Patent, filed Feb. 12, 1912, Serial No. 677,086, of which this case is a division. It will be understood, however, that the particular construction described and shown has been chosen for illustrative purposes merely and that the invention may be embodied in other forms without departing from the spirit and scope thereof.

In said drawings:—Figure 1 is a top plan view and Fig. 2 a side elevation of the sled complete. Fig. 3 is a detail perspective view of one of the inclined braces constituting parts of the frame work. Figs. 4 and 5 are detail perspective views, respectively, of one of the cross pieces or bars and one of the uprights forming parts of the framework. Fig. 6 is a detail sectional view taken through one of the cross pieces or bars immediately adjacent one of the uprights.

12 denotes the runners which are preferably constructed of steel bars substantially T-shaped in cross section. Said runners extend parallel to one another and are curved upwardly at their forward ends in the usual manner, said forward ends being connected by a cross bar 13 pivoted thereto.

The top or body of the sled comprises a suitable platform 14 and a frame composed of side bars 15 above and normally parallel to the runners 12 and rigidly connected at their forward ends by a cross piece 16 immediately above and parallel to the bar 13. The platform is preferably formed with a forwardly extending tongue 26 to which is pivoted a link 28 secured to a steering bar 31. Said steering bar is connected with the bar 13 by suitable means whereby turning of said steering bar 31 will result in laterally flexing the runners 12 for the purpose of steering the sled. These connections are not herein shown or described in detail as they form no portion of the present invention and are covered by the claims of my prior application aforesaid.

The sled top or body is supported from the runners 12 by a framework comprising cross pieces or bars 17, uprights 18, and inclined braces 19. The cross pieces 17 comprise channel bars secured at their central portions to the platform 14 and having at their outer ends depressed or flattened portions 40 upon which are seated, and to which are secured the side bars 15. Said side bars are usually slightly thicker or of slightly greater vertical extent than the platform 14, which difference in thickness is provided for by the depressed ends 40 of the bars 17, so that the upper surfaces of said bars 15 and platform 14 are brought flush with one another. The channel bars 17 are formed with side flanges or lateral bearing portions 41 which, intermediate the platform 14 and side bars 15, are preferably bent inwardly for short portions of their length, forming undercut sections 20 which are substantially triangular in cross section. The uprights 18 as shown also comprise channel bars bent over the bars 17 to form downwardly extending legs, the lower ends of which are provided with ears 23 for attachment to the upstanding flange of the corresponding runner 12. The side flanges 21 of said channel bars are cut away as indicated at 22 in order to cause the same to embrace the portions 20 of the bars 17 with a closely engaging fit. Each of the braces 19 comprises a bar substantially V-shaped in cross section having at its lower end ears 24 for attachment to the corresponding runner, and secured at its upper end, as at 25, to the corresponding side bar 15, preferably by means permitting a slight pivotal movement of said braces with respect to said bars.

The construction herein shown and described provides a framework for sleds of this character which may be easily and cheaply constructed, which is light and strong, and which is possessed of the necessary rigidity to make the sled safe and durable, while at the same time permitting the lateral flexibility of the runners incidental to the type of sled to which it is particularly adapted. It will be seen however, that certain features of this construction are not limited in their utility to sleds of this particular type, but may, if desired, be used in sleds having rigid runners and which are steered or controlled in other ways.

Having thus described my invention, I claim:

1. A sled comprising runners, a top or body, bars extending across said top or body and secured thereto and having lateral bearing portions, and uprights each comprising a single member bent over one of said bars and having a pair of downwardly extended legs secured to said runners, said uprights being cut away to embrace said bars and closely engage the lateral bearing portions thereof.

2. A sled comprising runners, a top or body, bars extending across said top or body and secured thereto and having undercut lateral bearing portions, and uprights each comprising a single member bent over one of said bars and having a pair of downwardly extending legs secured to said runners, said members being cut away to fit and closely engage said undercut portions of said bars.

3. A sled comprising runners, a top or body, channel bars extending across said top and secured thereto and having side flanges bent inwardly for portions of their length to form parts substantially triangular in cross section, and uprights comprising channel bars bent over said first named channel bars and having downwardly extended legs secured to said runners, said uprights having side flanges cut away to fit and closely engage the triangular portions of said first named channel bars.

In testimony whereof I affix my signature, in presence of two witnesses.

JOHN C. VAN AKEN.

Witnesses:
M. P. SHANLEY,
HARRY V. GILMORE.

---

Copies of this patent may be obtained for five cents each, by addressing the "Commissioner of Patents, Washington, D. C."